May 26, 1931.  J. R. BOYLE  1,807,191
ELECTRICALLY OPERATED VALVE
Filed March 24, 1930   2 Sheets-Sheet 1

Inventor
John R. Boyle
By Brown, Jackson, Boettcher & Dienner
Att'ys.

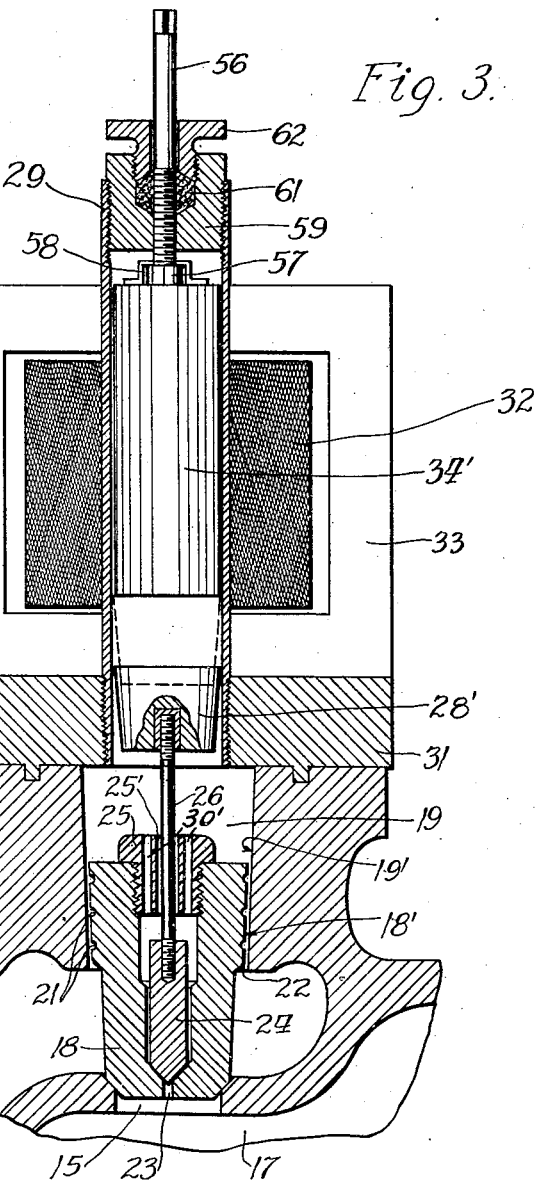

Patented May 26, 1931

1,807,191

UNITED STATES PATENT OFFICE

JOHN R. BOYLE, OF CHICAGO, ILLINOIS

ELECTRICALLY OPERATED VALVE

Application filed March 24, 1930. Serial No. 438,268.

The present invention relates to electrically operated valves, and is concerned more particularly with such valves which utilize the reciprocation of a solenoid armature to unseat a pilot valve and open a by-pass for creating an unbalanced pressure condition with respect to the main valve, which condition either effects or facilitates the opening of the main valve. In this type of valve structure the solenoid armature can be arranged to move in a hermetically sealed tube and the necessity of transmitting the normal valve operating motion through a packed joint is avoided, with the result that the entire valve structure can be hermetically sealed, there are no stuffing boxes with consequent friction and leakage, and the valve can be operated with only a small consumption of current.

Such type of valve has wide spread utility in a large number of fields. For example, it can be employed on the suction or frost side of a refrigerating coil where the low temperature of the refrigerant would congeal the lubricated packing of an ordinary valve, and it can also be used in various other relations in a refrigerating system where its hermetically sealed characteristic is of decided value for preventing all possibility of leakage of the refrigerant. Moreover, such type of valve can be used to advantage as an unloading valve in shunt between the inlet and outlet sides of a compressor, and may be used in various other situations, particularly for controlling steam or other fluids operating under high pressures.

The general object of the invention is to improve upon valves of this type to make their operation and durability more efficient, reliable and satisfactory. Other more specific objects of the invention are: to provide a construction which eliminates the vibration and noise usually present in these valves when operated from alternating current, such vibration and noise being generally caused by the solenoid armature vibrating in synchronism with the current; to provide a construction in which the solenoid armature operates to mechanically lift and hold the main valve element away from its valve seat, independently of the existence of any pressure in the valve housing, after the by-pass pilot valve has been opened; to provide a construction in which a tapered relation exists between the main valve element and the upper chamber in which said valve element moves in being lifted from the valve seat, this tapered relation preventing any possibility of sticking or binding of the main valve element; to provide a construction which may have the additional function of a safety valve for automatically releasing excessive pressures when the valve is closed; and, to provide a construction in which the valve element may be positively retained in closed position by a manual operation so that the device can function as a stop valve, being held against opening even against a back pressure. Other objects and advantages of the invention will appear from the following detailed description of a preferred embodiment thereof.

In the accompanying drawings illustrating such embodiment:

Figure 3 is a fragmentary view, similar to Figure 1, illustrating another modified construction which may also have the positive closure feature incorporated therein, and Figures 4 and 5 are detail views showing how a shading coil may be embodied in the solenoid armature, if desired.

Figure 1:
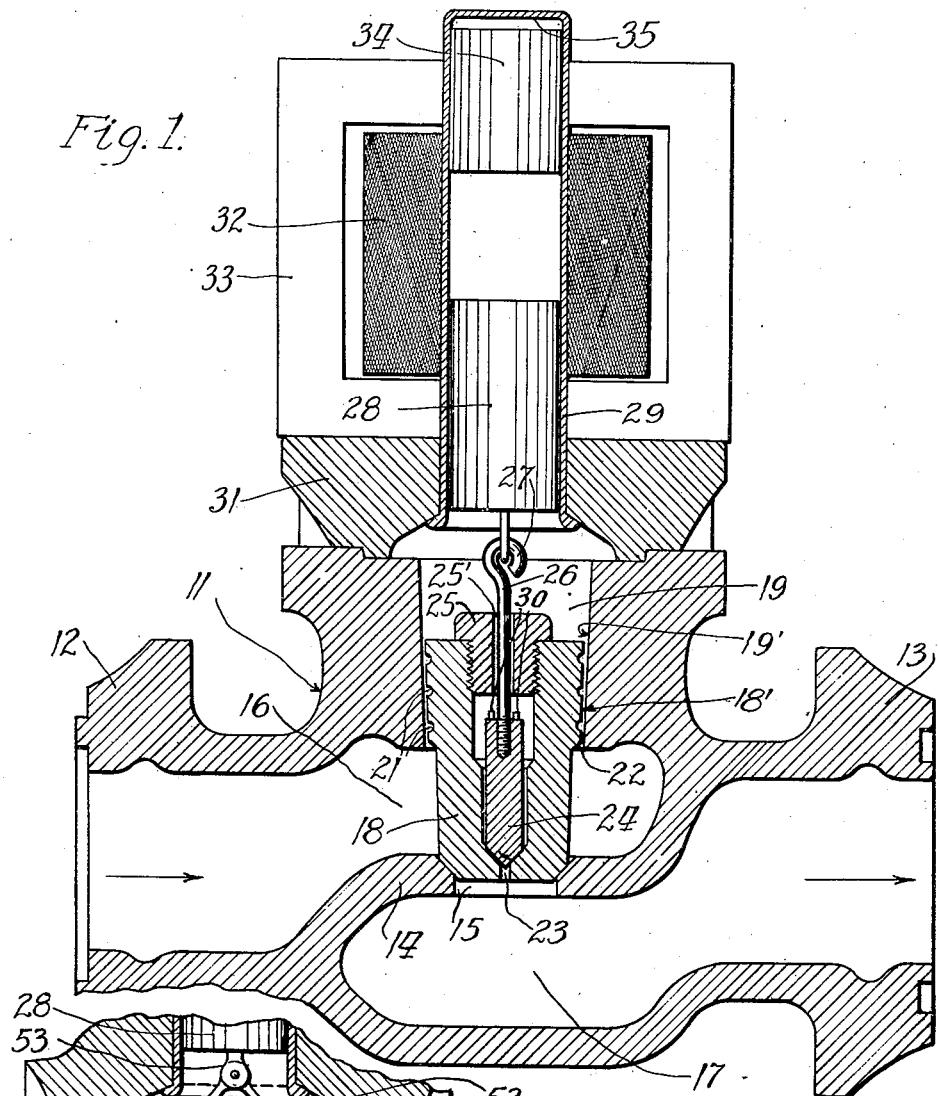
Figure 1 is a vertical axial sectional view through the valve structure.

Referring first to Figure 1, the device comprises a valve body or casing 11 having a fluid passageway therethrough communicating at one end with the inlet connection 12 and at the other end with the outlet connection 13. These connections may be flanged or threaded for establishing either type of coupling with the sections of the fluid conduit in which the valve is interposed. Within the valve body is the usual horizontal web or diaphragm portion 14 having the valve port 15 therein which establishes communication between the upper inlet passageway 16 and the lower outlet passageway 17. Cooperating with this valve seat is the main valve element 18, the coacting faces of said valve element and of the valve seat being tapered or being constructed for any other type of seating contact. Formed in the upper portion of the valve casing 11 is a chamber 19, disposed in axial alignment with the valve seat 15, and into which chamber the upper portion of the main valve element 18 extends. This chamber is formed with its side walls 19' having a slight downwardly converging taper which extends down to the point where the lower end of said chamber communicates with the inlet passageway 16. The upper portion of the main valve element, normally reposing in the chamber 19, is also formed with a corresponding taper 18'. If desired, annular grooves 21 may be formed in this upper tapered portion 18'. When the valve element is in its lower seated position the two tapers 18' and 19' are in very close proximity to each other, but a very slight clearance is maintained therebetween to form an annular passage 22 through which a restricted leakage of the fluid can occur up into the chamber area 19 above the top of the valve element. It will be evident that if the fluid pressure leaking up through this passageway 22 is allowed to accumulate above the piston valve 18 it will effectively hold said valve to its seat 15.

The opening of the valve is effected by relieving the accumulation of pressure in the pressure chamber 19 down into the outlet passageway 17, such pressure relief being at a higher rate than the rate of leakage through the restricted passageway 22, whereby the inlet pressure acting upwardly on the enlarged upper end 18' of the main valve tends to raise said valve to open position. This pressure relief is effected by a by-pass and cooperating pilot valve which establish a shunt from the upper end of the chamber 19 to the outlet passageway 17. In the preferred embodiment herein shown, this by-pass and pilot valve are embodied within the body of the main valve 18, although I wish it to be understood that numerous features of my invention may be utilized in structures in which said by-pass and pilot valve are not carried by the main valve element. The by-pass is indicated at 23, consisting of a relatively small axial passageway opening down through the lower end of the main valve body 18. This passageway communicates with successively enlarging counterbores, the lower one of which forms a guideway for the pilot valve 24 which loosely engages therein, and the upper one of which is threaded for receiving a threaded cap 25. Screwing into the pilot valve 24 is a rod 26 which extends upwardly through a bore 25' in the cap 25; this bore being smaller than the diameter of the pilot valve so that in the first upward movement of the rod 26 the pilot valve will be lifted from its seat on the by-pass 23 and further upward movement will cause said pilot valve to engage the underside of the cap 25 for lifting the entire valve assembly as a unit upwardly away from the main valve seat 15.

The upper end of the pilot valve 24 may have any suitable loose fitting contact with the under side of the cap 25 so that when said pilot valve is pulling upwardly against the cap for lifting the main valve the bore 25' is not closed off. If desired, some small angularly spaced lugs or teats 30 may project from the head end of the pilot valve as shown in Figure 1 for contacting with the under side of the cap so as to leave the lower end of the bore 25' open, through the spaces between said lugs, when the pilot valve is pulling upwardly against the cap; or, as shown in Figure 3, one or more passageways 30' may be extended down through the cap 25 at points spaced outwardly of the head end of the pilot valve 24.

The rod 26 has any suitable connection, as through the hook and loop joint illustrated at 27, with a solenoid armature 28 which is adapted to move endwise in a guide tube 29. The lower portion of said tube 29 is hermetically sealed in a bonnet or top closure member 31 which is tightly secured to the upper portion of the valve housing 11 over the chamber 19. Surrounding the tube or sleeve 29, above the bonnet member 31, is the electromagnetic structure comprising the winding 32 and the magnetic field elements 33. The field structure is preferably laminated, comprising groups of C-shaped laminations 33 with the inner ends of their legs disposed in proximity to or in contact with the guide sleeve 29. A large number of these laminated groups may be disposed at different angular points about the sleeve, or only two of these groups may be disposed at diametrically opposite sides thereof, the latter arrangement being shown. Fixedly mounted in the upper portion of the tube 29, and disposed substantially in the horizontal plane of the upper legs of the magnet laminations 33, is a laminated core member 34, which extends the metallic magnetic circuit down into the sleeve toward the armature 28. This core plug 34 may be employed to hermetically seal the upper portion of the tube 29, or a closure member 35 may be welded, brazed or otherwise secured in the upper end of the tube to seal the same. Said tube is preferably of non-magnetic metal characterized by a high electrical resistance and high heat conductivity, as I shall presently describe. The armature 28 has a free sliding fit in said tube.

When the device is deenergized the parts occupy the positions illustrated in Figure 1. Any fluid pressure prevailing in the inlet passageway 16 is transferred through the restricted annular passageway 22 and is effective on the upper end of the main valve element 18 for holding the latter to its seat 15 under pressure. This same pressure of the fluid holds the pilot valve 24 closed against the end of the by-pass 23. When the winding 32 is energized the armature 28 is drawn upwardly to dispose more of its length within the field of the winding. The initial upward movement unseats the pilot valve 24, it being evident that only a small operating energy is required to lift said valve from the by-pass 23 even against very high fluid pressure, because of the relatively small area of said by-pass. However, the area of said by-pass is larger than the effective area of the leakage passageway 22 so that the pressure existing above the main valve element 18 is quickly reduced or released, down through the by-pass into the outlet passageway 17. Thereafter, the continued upward pull effective on the armature 28, together with the difference of fluid pressures above and below the tapered enlarged portion 18′, causes the valve 18 to be raised into the upper portion of the chamber 19, thereby opening the valve port 15 to the fullest extent. As long as the winding 32 remains energized the valve 18 will be held in its raised position, with the port 15 wide open. It will be noted that this direct mechanical lift of the valve by the solenoid armature 28 will result in the valve being raised to a position entirely clear of the valve seat, and held in that position during the entire energized interval of the valve, irrespective of whether or not a fluid pressure is actually prevailing in the inlet passageway 16. Thus, the valve does not float or ride on the fluid pressure passing through the valve port 15, nor will the valve vibrate or oscillate with pressure fluctuations of the fluid passing through the port. As soon as the winding 32 is deenergized the armature 28 drops and seats the pilot valve 24 against the upper end of the by-pass passageway 23, the weight of the armature 28 being thereafter imposed directly on the valve 18 tending to force it to closed position. With the closing of the by-pass 23, pressure rapidly builds up in the chamber 19, and this pressure is also effective for quickly forcing the valve down into engagement with the seat of the port 15.

By virtue of the taper 18′ on the upper portion of the valve 18 and the taper 19′ in the chamber 19 the restricted leakage passageway 22 may be accurately machined and maintained when the valve is in closed position, but, at the same time, there is no possibility of upward movement of the valve being restricted or prevented by binding, because the tapered relation results in the space between the valve and the walls of the chamber 19 increasing as the valve moves upwardly. While it is preferable to obtain this tapered relation by tapering both of the surfaces 18′ and 19′ it will be understood that such tapered relation might be obtained by tapering only one of these surfaces. The tube or sleeve 29 is preferably a non-magnetic metal characterized by high electrical resistance, high tensile strength and good thermal conductivity, whereby said tube will be capable of withstanding the fluid pressures prevailing therein above and below the solenoid armature 28 and whereby said tube will assist in minimizing the heating consequent upon long energized intervals of the winding 32. In addition, when the valve is used in a refrigerating system, this tube should be non-corrosive and not attacked by any of the common refrigerants such as ammonia, ammonium hydroxide, sulphur dioxide, methal chloride or carbon dioxide. I have found that all of these requirements may be met by constructing this tube of an alloy having the following approximate composition:

| | |
|---|---|
| Carbon | Under .20 |
| Manganese | Under .50 |
| Silicon | Under .50 |
| Sulphur | Under .025 |
| Phosphorus | Under .025 |
| Chromium | 17.0 to 20.00 |
| Nickel | 7.0 to 10.00 |

Figure 2:
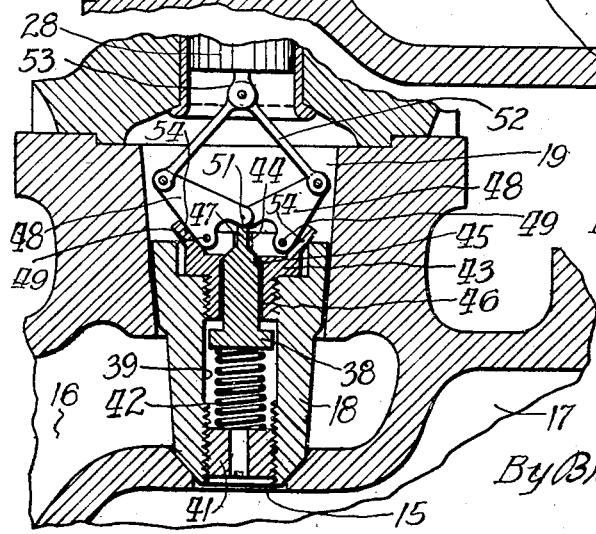
Figure 2 is a fragmentary vertical sectional view through the main valve element, illustrating the latter modified to have the additional function of a safety valve and also permitting said main valve element to be positively held closed against back pressure.

In Figure 2 I have illustrated how a safety valve function can be incorporated in the present valve structure. The valve body 18 has the same general relation to the valve port 15 and chamber 19, but mounted within the body of the valve 18 is a spring pressed valve 38 which has the dual function of a pilot valve for opening the by-pass through the main valve, and also of a safety valve for preventing the pressure in the inlet passageway 16 from rising above a predetermined maximum. This secondary valve 38 is disposed in an axial bore 39 in the body of the main valve, the lower end of said bore being threaded to receive a plug 41. This plug is apertured to allow the valved fluid to pass therethrough, and bearing on said plug is a compression spring 42 which normally tends to move the secondary valve 38 upwardly to closed position, the spring pressure tending to so move said valve being adjustable by screwing the plug member 41 upwardly or downwardly in the bore 39. Screwing into the threaded upper end of said bore is a valve cage or bushing 43 having a passageway 44 in its upper end, a tapered valve seat 45 coextensive with said passageway, and an enlarged bore 46 extending down from said valve seat. The body of the secondary valve 38 fits loosely in the bore 46 and has a tapered upper shoulder for engaging with the valve seat 45. A stem portion 47 extends upwardly from said tapered shoulder through the passageway 44, in spaced relation thereto, and projects from the top of the bushing 43. A pair of oppositely disposed bell crank levers 48 are pivotally mounted at 49 on the top of the bushing 43, and these levers comprise inwardly extending arms having rounded bottom surfaces, as indicated at 51, which are adapted to bear against the upper end of the projecting stem 47. Links 52 are pivotally connected with the outer arms of said levers and with a lug or eye 53 on the armature 28. When the device is also used as a stop valve, as hereinafter described, it is necessary to transmit downward pressure from the armature 28 to the main valve 18 while the pilot valve remains closed. To this end, the top of the bushing 43 is provided with stops 54 against which the outer sides of said levers normally bear when the valve is closed and through which downward pressure can also be transmitted to the valve from the armature.

Normally the valve 38 is held by spring pressure up against the valve seat 45, thereby closing the by-pass 44 within the main valve. Upon the energization of the solenoid winding the upward movement of the armature 28 rocks the two bell crank levers 48, thereby thrusting the secondary valve 38 downwardly and opening the by-pass for effecting the opening of the main valve, substantially in the same manner described of the preceding embodiment. The relatively small area of the by-pass 44 enables the armature to open the valve 38 even against extremely high pressures. With regard to the safety valve function, it will be evident that substantially the same pressure will prevail in the upper part of the chamber 19 as in the inlet passageway 16, and if this pressure exceeds a predetermined maximum, as determined by the pressure established in the spring 42, the valve 38 is forced downwardly away from the seat 45, thereby allowing this excessive pressure to be shunted through the main valve. Such automatic opening of the by-pass may result in the main valve 18 also lifting slightly to release this excessive pressure.

In Figure 3 I have illustrated a modified construction wherein provision is made to avoid the vibratory noise of the solenoid armature when the solenoid is energized by alternating current, and wherein provision is also made for manually closing the main valve and retaining it in closed position. In this embodiment the normally stationary core 34' extends down to have its lower end terminate in proximity to the bottom legs of the magnetic field members 33. The armature 28' is attracted up against the end of this core, in which position the armature lies substantially in the plane of these bottom legs. Said armature is of short length compared to the transverse dimension of its upper face, so that the magnetic attraction holding this upper face against the end of the core 34' will exceed the force tending to vibrate the armature laterally. That is to say the area of that portion of the armature contacting with the core is so proportioned relative to the length of that portion of the armature lying within the effective magnetic field threading the lower legs of the field elements 33 that this portion of the alternating magnetic field, which would otherwise tend to vibrate the armature laterally, does not have sufficient leverage on the armature and cannot exert sufficient force to overcome the magnetic grip of the armature on the lower end of the core 34'.

When the valve is in its normal closed position the armature 28' occupies the position illustrated in full lines in Figure 3. It will be evident that by moving the core member 34' down against the upper side of the armature, when the latter is in this lower position, the valve can be locked in closed position, whereby it can be employed as a stop valve. To this end, the upper end of the core 34' may be connected with a screw stem 56 through the actuation of which the core may be raised and lowered. The lower end of this screw stem has a shouldered head 57 engaging in a flanged cage or retaining member 58 secured to the top of the core so that upward movement of the stem is operative to lift the core. The threaded portion of the stem screws through a tapped lower portion of a plug 59 which is secured in the upper end of the tube 29. A packing 61, compressed by a gland nut 62, seals the threaded stem 56 against leakage out through the plug 59. It will be evident that by screwing this stem downwardly the core 34' can be brought down against the top of the armature 28' for positively retaining the secondary valve and the main valve to their respective seats, irrespective of the presence of fluid pressures on either side of these valve members, and irrespective of the energization of the solenoid winding. In order to transmit this pressure from the armature 28' down to the valve elements the rod 26 of the pilot valve 24 is threaded into the armature or is otherwise secured thereto for transmitting this downward pressure.

It will be evident from the foregoing that this positively closed stop construction can also be embodied in the safety valve form illustrated in Figure 2. Downward pressure transmitted from the shiftable core 34' to the armature 28 of Figure 2 will be transmitted down through the links 52, levers 48 and stop abutments 54 for positively holding the main valve 18 to its seat. The secondary valve 38 cannot be opened by a counter pressure in the outlet passageway 17 because this secondary valve is a check valve in that direction. With the positive closure feature incorporated in Figure 2, it will be evident that this one valve structure will have the three fold utilities of an electrically operated valve, a safety valve, and a positive stop valve. In each of the previously described embodiments, the armature 28 or 28′ is preferably laminated, and because of the ability of the armature and valve body to rotate, the laminations of the armature will assume a position in parallelism with the laminations of the field structure 33 under the influence of the magnetic field. When using the stop type of valve in a refrigerating system there will be practically no tendency for the packing 61 to freeze up because of the heating action of the solenoid winding 32.

While I prefer to employ the above described relation of a relatively short, wide faced armature 28′ adapted to contact with a magnetic core 34′, for eliminating the vibratory noise which would otherwise be present when employing an alternating current, other methods of silencing the valve may be employed in lieu thereof or acting in conjunction with the above described construction. For example, in Figures 4 and 5 I have illustrated how a shading coil 65 may be associated with the armature 28′, such probably being of most benefit when operating on current of relatively low frequency. For mounting this shading coil, the top face of the armature is provided with a diametrical slot 66 and with a semicircular groove 67 extending around the top face thereof and joining with the ends of said slot. The shading coil 65 is fixedly secured in this slot and groove. Such shading coil establishes another flux displaced in phase relation to the main flux (approximately in quadrature thereto) and thereby distributes or smooths out the flux impulses acting on the armature, whereby its vibration is minimized. If desired, one or more of these shading coils may be associated with the ends of the legs of the field elements 33, acting either alone or in conjunction with a shading coil on the armature.

While I have shown what I regard to be the preferred embodiment of my invention, nevertheless it will be understood that such is merely exemplary and that numerous modifications and rearrangements may be made without departing from the essence of the invention.

I claim:

1. A valve device comprising a casing having inlet and outlet passageways, a valve port therebetween, a main valve for closing said port, a chamber communicating with one of said passageways, said main valve being responsive to the pressure condition in said chamber, a by-pass for placing said chamber in communication with the other of said passageways, a by-pass valve controlling said by-pass, electromagnetic means for operating said valve device comprising an armature, and means connecting said armature with said secondary valve and with said main valve whereby said armature is operative to open said by-pass valve and to exert mechanical force on said main valve for moving the latter to open position.

2. A valve device comprising a casing having inlet and outlet passageways, a valve port therebetween, a main valve for closing said port, a chamber communicating with one of said passageways, said main valve being responsive to the pressure condition in said chamber, a by-pass for placing said chamber in communication with the other of said passageways, a valve controlling said by-pass, electromagnetic means for operating said valve device comprising a magnetic winding and a solenoid armature attracted thereby, and means connecting said armature with said by-pass valve and with said main valve whereby said armature is operative to open said by-pass valve and is also operative to exert mechanical force on said main valve to assist in moving the latter to open position.

3. A valve device comprising a casing having inlet and outlet passageways, a valve port therebetween, a main valve for closing said port, a pressure chamber, a restricted passageway connecting said inlet passageway with said pressure chamber, said main valve being responsive to the pressure condition in said chamber, a by-pass for placing said pressure chamber in communication with said outlet passageway, a by-pass valve controlling said by-pass, electromagnetic means for operating said valve device comprising a solenoid armature, and means connecting said armature with said by-pass valve and with said main valve whereby said armature is operative to open said by-pass valve and is also operative to hold said main valve away from said valve port.

4. A valve device comprising a casing having inlet and outlet passageways, a valve port therebetween, a main valve for closing said port, a chamber communicating with one of said passageways, said main valve being responsive to the pressure condition in said chamber, a by-pass for placing said chamber in communication with the other of said passageways, a by-pass valve controlling said by-pass, electromagnetic means for operating said valve device comprising an armature, means connecting said armature with said by-pass valve for moving the latter, and means for transmitting motion from said by-pass valve to said main valve.

5. A valve device comprising a casing having inlet and outlet passageways, a valve port therebetween, a main valve for closing said port, a pressure chamber, a restricted passageway extending from said inlet passageway to said pressure chamber, said main valve being responsive to the pressure condition in said chamber, a by-pass for placing said pressure chamber in communication with said outlet passageway, a by-pass valve operating within said main valve and controlling said by-pass, electromagnetic means for operating said valve device comprising an armature, means connecting said armature with said by-pass valve and operative to move the latter to open position, and means for transmitting motion from said by-pass valve to said main valve whereby said armature is operative to hold said main valve in open position.

6. A valve device comprising a casing having and outlet passageways, a valve port therebetween, a main valve for closing said port, a pressure chamber, a restricted passageway connecting said inlet passageway with said pressure chamber, said main valve being responsive to the pressure conditions in said inlet passageway and in said pressure chamber, a by-pass in said main valve for placing said pressure chamber in communication with said outlet passageway, a by-pass valve in said main valve controlling said by-pass, electromagnetic means for operating said valve device comprising a solenoid armature, means connecting said armature with said by-pass valve and operative to move the latter to open position with respect to said by-pass, and cooperating shoulders associated with said by-pass valve and said main valve whereby the operative movement of said armature is effective to transmit a mechanical force tending to open said main valve and whereby said armature is operative to mechanically hold said main valve in open position.

7. A valve device comprising a casing having inlet and outlet passageways, a valve port therebetween, a main valve for controlling said port, a chamber communicating with one of said passageways, said main valve being responsive to the pressure condition in said chamber, a by-pass for venting said chamber, a secondary valve controlling said by-pass, electromagnetic means for operating said valve device comprising an armature, and means connecting said armature with said secondary valve and with said main valve whereby said armature is operative to transmit mechanical force to both of said valves for controlling the latter.

8. A valve device comprising a casing having inlet and outlet passageways, a valve port therebetween, a valve for closing said port, a chamber communicating with one of said passageways, said valve having a piston portion operating in said chamber, the adjacent walls of said piston portion and of said chamber having a tapered relation, said valve being responsive to the pressure condition in said chamber, a by-pass for venting said chamber, and electrically operated means for controlling said by-pass.

9. A valve device comprising a casing having inlet and outlet passageways, a valve port therebetween, a main valve for closing said port, a chamber communicating with one of said passageways, said main valve comprising a piston portion extending into said chamber, the annular wall of said piston portion being normally slightly spaced from the annular wall of said chamber, one of said walls being tapered, a by-pass for placing said chamber in communication with the other of said passageways, a by-pass valve controlling said by-pass, and electromagnetic valve operating means comprising an armature operatively connected with said by-pass valve to control said by-pass.

10. A valve device comprising a casing having inlet and outlet passageways, a valve port therebetween, a main valve for closing said port, a pressure chamber, said main valve comprising a piston portion extending into said pressure chamber, the annular wall of said piston portion being normally slightly spaced from the annular wall of said pressure chamber and defining a leakage passageway therebetween for placing said pressure chamber in communication with said inlet passageway, one of said annular walls being tapered longitudinally whereby the restricted space between said walls increases in size as the piston portion moves further into said pressure chamber, a by-pass for placing said pressure chamber in communication with said outlet passageway, a by-pass valve controlling said by-pass, and electromagnetic valve operating means comprising a solenoid armature operatively connected with said by-pass valve for opening said by-pass.

11. A valve device comprising a casing having inlet and outlet passageways, a valve port therebetween, a pressure chamber extending upwardly from said inlet passageway in alignment with said valve port, a main valve for closing said port, said valve comprising a piston portion extending up into said pressure chamber, the annular wall of said piston portion being spaced from the annular wall of said pressure chamber to define a leakage passageway for admitting fluid pressure from said inlet passageway to the upper portion of said pressure chamber, both of said annular walls being tapered convergingly downwardly whereby to increase the clearance between the piston portion of said valve and said pressure chamber as the valve moves upwardly into said chamber, a by-pass extending down through said main valve and communicating with said outlet passageway, a by-pass valve within said main valve controlling said by-pass, electromagnetic means for operating said valve device comprising a solenoid armature, and motion transmitting means between said armature and said valves whereby said armature is operative to open said by-pass valve and to exert mechanical force on said main valve for moving the latter to open position.

12. A valve device comprising a casing having inlet and outlet passageways, a valve port therebetween, a main valve for closing said port, a chamber communicating with one of said passageways, said main valve being responsive to the pressure condition in said chamber, a by-pass for venting said chamber, and a secondary valve controlling said by-pass and adapted to function as a safety valve and also as an electrically operated by-pass valve, said secondary valve functioning as a safety valve by opening said by-pass when excessive pressures arise in said chamber, and electrically operated means operatively connected with said secondary valve for opening said by-pass.

13. A valve device comprising a casing having inlet and outlet passageways, a valve port therebetween, a main valve for closing said port, a chamber communicating with one of said passageways, said main valve being responsive to the pressure condition in said chamber, a by-pass for placing said chamber in communication with the other of said passageways, a secondary valve controlling said by-pass, means normally tending to hold said secondary valve closed but permitting the opening thereof when the pressure in said chamber rises above a predetermined point whereby said secondary valve functions as a safety valve, and electrically operated means for opening said secondary valve.

14. A valve device comprising a casing having inlet and outlet passageways, a valve port therebetween, a main valve for closing said port, a pressure chamber communicating with said inlet passageway, said main valve being responsive to the pressure condition in said chamber, a by-pass for placing said pressure chamber in communication with said outlet passageway, a secondary valve controlling said by-pass, spring means normally tending to hold said secondary valve closed but permitting the opening thereof when the pressure in said pressure chamber rises above a predetermined maximum whereby said secondary valve functions as a safety valve, and electro-magnetic means for operating said valve device, comprising a solenoid armature operatively connected to open said secondary valve.

15. A valve device comprising a casing having inlet and outlet passageways, a valve port therebetween, valve mechanism comprising a main valve and a by-pass valve, said main valve being adapted to close said port, a chamber communicating with one of said passageways, said main valve being responsive to the pressure condition in said chamber, a by-pass for placing said chamber in communication with the other of said passageways, said by-pass valve controlling said by-pass, electromagnetic means for operating said valve mechanism comprising an armature operatively conected with said by-pass valve, and manually operated means cooperating with said valve mechanism for holding said valve port closed.

16. A valve device comprising a casing having inlet and outlet passageways, a valve port therebetween, a main valve for closing said port, a pressure chamber communicating with said inlet passageway, said main valve being responsive to the pressure condition in said chamber, a by-pass for placing said pressure chamber in communication with said outlet passageway, a by-pass valve controlling said by-pass and adapted to engage with said main valve, electromagnetic means for operating said valve device comprising a shiftable core member, a solenoid armature adapted to be attracted toward said core member, means operatively connecting said armature with said by-pass valve, and means operable to shift said core member into engagement with said armature when the latter is in its nonattracted position whereby to positively hold said main valve in closed position.

17. A valve device comprising a casing having inlet and outlet passageways, a valve port therebetween, a main valve for closing said port, a chamber communicating with one of said passageways, said main valve being responsive to the pressure condition in said chamber, a by-pass for placing said chamber in communication with the other of said passageways, a secondary valve controlling said by-pass, said secondary valve functioning as a safety valve by opening said by-pass when excessive pressures arise in one of said passageways, electrically operated means operatively connected with said secondary valve for opening said by-pass, and manually operated means cooperating with said main valve for positively holding said main valve in closed position.

18. A valve device comprising a casing having inlet and outlet passageways, a valve port therebetween, valve mechanism comprising a main valve and a by-pass valve, said main valve being adapted to close said port, a chamber communicating with one of said passageways, said main valve being responsive to the pressure condition in said chamber, a by-pass for placing said chamber in communication with the other of said passageways, said by-pass .alve controlling said by-pass, and electromagnetic means for operating said valve mechanism comprising a metallic sleeve joined with said casing and hermetically sealed from the atmosphere, a solenoid armature adapted to reciprocate in said sleeve and to impart motion to said by-pass valve, a magnetic winding disposed outside of said sleeve and creating a flux for actuating said armature, said sleeve being composed of carbon, manganese, silicon, sulphur, phosphorus, chromium and nickel in approximately the proportions stated whereby said sleeve is substantially non-magnetic, is characterized by high electrical resistance, and is substantially non-corrosive to chemical reaction from refrigerants and the like.

In witness whereof, I hereunto subscribe my name this first day of March, 1930.

JOHN R. BOYLE.